(12) United States Patent
Khalid et al.

(10) Patent No.: US 7,987,506 B1
(45) Date of Patent: Jul. 26, 2011

(54) METHODS AND SYSTEMS FOR DYNAMICALLY UPDATING A ROUTING TABLE IN A VIRTUAL PRIVATE NETWORK

(75) Inventors: Mohamed Khalid, Cary, NC (US);
Rajiv Asati, Morrisville, NC (US);
Shashidhar P. Patil, Karnataka (IN);
Aamer Akhter, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 980 days.

(21) Appl. No.: 11/592,505

(22) Filed: Nov. 3, 2006

(51) Int. Cl.
*G06F 15/16* (2006.01)
(52) U.S. Cl. .......................... 726/15; 370/401
(58) Field of Classification Search .............. 709/203, 709/230, 223, 224, 226, 229, 249; 370/328, 370/329, 356, 401, 310
See application file for complete search history.

(56) References Cited

U.S. PATENT DOCUMENTS

| | | | |
|---|---|---|---|
| 7,020,464 B2 * | 3/2006 | Bahl et al. | 709/228 |
| 7,616,646 B1 * | 11/2009 | Ma et al. | 370/401 |
| 2006/0187942 A1 * | 8/2006 | Mizutani et al. | 370/401 |
| 2006/0271707 A1 * | 11/2006 | Cheline et al. | 709/245 |
| 2008/0008185 A1 * | 1/2008 | Lindgren et al. | 370/393 |

* cited by examiner

*Primary Examiner* — Brandon S Hoffman
(74) *Attorney, Agent, or Firm* — Hickman Palermo Truong & Becker LLP (57) ABSTRACT

A method, system, and computer program product for dynamically updating a routing table in a virtual private network including a concentrator with a routing table and one or more security associations is provided. A change is identified in the virtual private network, and related network information is also identified. A notification update message is created, including (i) a type of change to be made to the routing table based on to the identified change and (ii) the related network information. The notification update message is sent to the concentrator, which updates the routing table according to the notification update message. During the updating of the routing table of the concentrator, current security associations of the virtual private network tunnel are maintained.

14 Claims, 10 Drawing Sheets

201 IDENTIFY A CHANGE IN A VIRTUAL PRIVATE NETWORK, AND RELATED NETWORK INFORMATION

205 IDENTIFY AT LEAST ONE UNAVAILABLE NETWORK LINK WITHIN THE VIRTUAL PRIVATE NETWORK AND THE NETWORK ADDRESS OF THE AT LEAST ONE UNAVAILABLE NETWORK LINK     206 IDENTIFY AT LEAST ONE NEWLY AVAILABLE NETWORK LINK WITHIN THE VIRTUAL PRIVATE NETWORK AND THE NETWORK ADDRESS OF THE AT LEAST ONE NEWLY AVAILABLE NETWORK LINK

202 CREATE A NOTIFICATION UPDATE MESSAGE, WHEREIN THE NOTIFICATION UPDATE MESSAGE COMPRISES (I) A TYPE OF CHANGE TO BE MADE TO A ROUTING TABLE IN A CONCENTRATOR BASED ON THE IDENTIFIED CHANGE AND (II) THE RELATED NETWORK INFORMATION

207 CREATE A NOTIFICATION UPDATE MESSAGE, WHEREIN THE TYPE OF CHANGE COMPRISES A DELETE ATTRIBUTE AND THE RELATED NETWORK INFORMATION COMPRISES THE NETWORK ADDRESS OF THE AT LEAST ONE UNAVAILABLE NETWORK LINK         209 ENCODE THE NETWORK ADDRESS OF THE AT LEAST ONE UNAVAILABLE NETWORK LINK IN THE DELETE ATTRIBUTE OF THE NOTIFICATION UPDATE MESSAGE     208 CREATE A NOTIFICATION UPDATE MESSAGE, WHEREIN THE TYPE OF CHANGE COMPRISES AN ADD ATTRIBUTE AND THE RELATED NETWORK INFORMATION COMPRISES THE NETWORK ADDRESS OF THE AT LEAST ONE NEWLY AVAILABLE NETWORK LINK         210 CREATE A NOTIFICATION UPDATE MESSAGE, WHEREIN THE TYPE OF CHANGE COMPRISES AN ADD ATTRIBUTE, WHEREIN THE ADD ATTRIBUTE ENCODES AN ADMIN-DISTANCE VALUE TO SET PREFERENCES FOR ALTERNATIVE ROUTES         211 ENCODING THE NETWORK ADDRESS OF THE AT LEAST ONE NEWLY AVAILABLE NETWORK LINK IN THE ADD ATTRIBUTE OF THE NOTIFICATION UPDATE MESSAGE

TO FIG. 3B STEP 203

401 RECEIVE A NOTIFICATION UPDATE MESSAGE, WHEREIN THE NOTIFICATION UPDATE MESSAGE COMPRISES A TYPE OF CHANGE TO BE MADE TO A ROUTING TABLE IN A CONCENTRATOR AND RELATED NETWORK INFORMATION

404 RECEIVE A NOTIFICATION UPDATE MESSAGE, WHEREIN THE NOTIFICATION UPDATE MESSAGE COMPRISES AN ENCODED DELETE ATTRIBUTE AND THE RELATED NETWORK INFORMATION COMPRISES THE NETWORK ADDRESS OF AT LEAST ONE UNAVAILABLE NETWORK LINK, WHEREIN THE NETWORK ADDRESS OF AT LEAST ONE UNAVAILABLE NETWORK LINK IS ENCODED AS PART OF THE DELETE ATTRIBUTE

405 RECEIVE A NOTIFICATION UPDATE MESSAGE, WHEREIN THE NOTIFICATION UPDATE MESSAGE COMPRISES AN ENCODED ADD ATTRIBUTE AND THE RELATED NETWORK INFORMATION COMPRISES THE NETWORK ADDRESS OF AT LEAST ONE NEWLY AVAILABLE NETWORK LINK, WHEREIN THE NETWORK ADDRESS OF AT LEAST ON NEWLY AVAILABLE NETWORK LINK IS ENCODED AS PART OF THE ADD ATTRIBUTE

406 RECEIVE A NOTIFICATION UPDATE MESSAGE, WHEREIN THE NOTIFICATION UPDATE MESSAGE COMPRISES AN ENCODED ADD ATTRIBUTE AND THE RELATED NETWORK INFORMATION COMPRISES THE NETWORK ADDRESS OF AT LEAST ONE NEWLY AVAILABLE NETWORK LINK, WHEREIN THE NETWORK ADDRESS OF AT LEAST ON NEWLY AVAILABLE NETWORK LINK IS ENCODED AS PART OF THE ADD ATTRIBUTE, AND WHEREIN THE ADD ATTRIBUTE FURTHER ENCODES AN ADMIN-DISTANCE VALUE TO SET PREFERENCES FOR ALTERNATIVE ROUTES

TO FIG. 5B
STEP 402

METHODS AND SYSTEMS FOR DYNAMICALLY UPDATING A ROUTING TABLE IN A VIRTUAL PRIVATE NETWORK

BACKGROUND

Virtual private networks provide for the establishment of a secure connection, known as a tunnel, which exists on and sends traffic over a public network such as the Internet. Traffic sent through the tunnel is encrypted and only those with access to the tunnel are able to use it to send encrypted traffic. An end-user of the virtual private network may access the virtual private network remotely by logging on to the network through a computer. The computer may include the software needed to access the virtual private network, in which case the computer is referred to as a software client. Alternatively, the user may log on to the network by first establishing a connection between a computer and a hardware client, and then using the hardware client to log on to the network. A hardware client is a type of network hardware device that operates as a client in a virtual private network environment and is used an alternative to a software client. A hardware client is capable of providing access to many computers, while a software client typically provides access to only one user. When a user logs onto a network remotely, the user is generally logging on through a device called a concentrator. A concentrator is a type of multiplexor that combines multiple channels onto a single transmission medium in such a way that all the individual channels may be simultaneously active. For example, Internet Service Providers (ISPs) use concentrators to combine their dial-up modem connections onto fast T-1 lines that connect to the Internet. Concentrators are also used in local area networks (LANs) to combine transmissions from a cluster of nodes. In this case, the concentrator is often called a hub. Typically, a concentrator contains a routing table, which lists the different possible routes for network traffic to travel. When a virtual private network session is started, typically a component of the routing table that is used to route traffic on the virtual private network is also established at this time. Similarly, the client, whether a software client or a hardware client, may also include a routing table that contains routes over the virtual private network.

One type of conventional virtual private network uses a secure protocol such as the IP Security (IPSec) protocol along with the Internet Key Exchange (IKE) protocol and Internet Security Association and Key Management Protocol (ISAKMP) protocol, to establish a tunnel between two peers on the network, such as a software client and a concentrator or a hardware client and a concentrator. The peers first establish a secure, encrypted management connection between themselves using IKE/ISAKMP, and then establish an IPSec session with Security Associations (SAs), resulting in the secure tunnel over which the network traffic travels. A Security Association is an association that specifies security properties from one peer to another peer. Once the tunnel has been established, either peer is able to send encrypted traffic over the tunnel using IPSec, For an IPSec tunnel to be established between two peers, there is a significant amount of configuration required at both peers. This includes IPSec policies, Diffie-Hellman parameters, encryption algorithms, and so on. In a large corporate environment with hundreds of sites, managing the IPSec configuration may get quite tedious. The Cisco Easy virtual private network feature, also known as EzVPN, eases IPSec configuration by allowing an almost no-touch configuration of the IPSec client.

EzVPN uses the Unity client protocol, which allows most IPSec virtual private network parameters to be defined at an IPSec gateway, which is also the EzVPN server. When an EzVPN client, either hardware or software, initiates an IPSec tunnel connection, the EzVPN server, such as a concentrator, pushes the IPSec policies and other attributes required to form the IPSec tunnel to the EzVPN client and creates the corresponding IPSec tunnel connection. The tunnel on the EzVPN client may be initiated automatically, manually, or it could be traffic triggered, depending on the configuration or type of EzVPN client used. Minimal configuration is required at the EzVPN client. EzVPN provides the following general functions in order to simplify the configuration process: negotiating tunnel parameters with encryption algorithms, Security Association (SA) lifetimes, and so on; user authentication by validating user credentials by use of Extended Authentication (XAUTH); and automatic configuration by pushing attributes such as Internet Protocol (IP) address, Domain Name System (DNS), Windows Internet Naming Service (WINS), and so on, using Mode-Configuration (MODECFG).

The term EzVPN client is used for both Cisco Unity virtual private network clients, called EzVPN software clients, and the Unity client protocol running on smaller Cisco routers like the 800, 1700, and 2600 series, commonly referred to as EzVPN hardware clients. The Cisco Easy virtual private network feature supports two modes of operation: Client Mode and Network Extension Mode.

EzVPN Client Mode is also known as Network/Port Address Translation (NAT/PAT) Mode. In this mode, all traffic from the client side uses a single IP address for all hosts on the private network. For example, all traffic from the hosts on the FastEthernet interface on the EzVPN client may be translated by NAT to a source IP address of 10.0.68.5, which is assigned by the EzVPN server as an attribute using MODECFG. The client keeps track of the mappings so that the traffic may be forwarded to the correct host on the private network.

EzVPN Network Extension Mode allows the EzVPN client to present a full, routable network to the tunneled network. IPSec encapsulates all traffic from the EzVPN client's private network, which is marked as 'inside' to networks behind the IPSec gateway. Therefore, devices behind the gateway have direct access to devices on the EzVPN client's private network via the tunnel and vice versa without the need for NAT or PAT. As there is no reason for NAT or PAT, the EzVPN server does not push down an IP address for tunneled traffic, but all other attributes like Access Control Lists (ACLs), DNS, and WINS, may be pushed down. For example, an ACL under the mode network-extension in the configuration may permit networks behind the "inside" network and allows traffic to and from subnets to be encrypted. Without the access list, only traffic to and from the "inside" subnet is encrypted.

The EzVPN server configuration is the same for both Client Extension Mode and Network Extension Mode. The client configuration determines which mode is being used.

Redundancy is always an integral part of any IPSec design and, in the case of EzVPN dead peer detection along with backup peer list, makes such a design possible. An alternate mechanism to provide EzVPN server redundancy is to push the backup server's address list down to the client as an attribute. Dead peer detection is on by default on the EzVPN clients.

EzVPN may be combined with XAUTH and MODECFG to provide extended authentication and thereby push all MODECFG attributes to the client. The attributes to be pushed may be defined locally on the EzVPN server or defined on an authentication, authorization, and accounting (AAA) server and defined either on a per-group or per-user basis. When AAA is used for pushing the attributes, AAA between EzVPN server and the AAA server requires a hard-coded password.

Two useful attributes for telecommuter scenarios are max-logins and include-local-lan. The max-logins attribute allows the administrator to restrict the number of simultaneous IPSec connections from the same user to the gateway. The include-local-lan attribute is very useful in scenarios in which the telecommuter's LAN has resources, such as printers, attached to the LAN and access to these resources is required when the VPN tunnel is up. The attributes may also be applied on a per-user basis. A user attribute overrides a group attribute value. These attributes are retrieved at the time user authentication occurs using XAUTH, and are then combined with group attributes and applied during Mode-Configuration.

SUMMARY

One issue with conventional virtual private network setup and configuration, such as discussed above with regards to the Cisco EzVPN, is that the configuration is static, having been established when a virtual private network session is started. Every time the relevant configuration is changed, the IPSec Security Associations (SAs) used to create the tunnel in the virtual private network session must be torn down and then re-established to account for changes in the network configuration. Moreover, if a link in the LAN that is part of the virtual private network tunnel fails for any reason, there is no provision to remove the route that includes the failed link from a routing table at the EzVPN server within the virtual private network, as the routes have been established based on static policy configuration and the corresponding security associations. Additionally, if new networks have to be added as part of the VPN, the IPSec SA(s) used to create tunnel(s) must be torn down and re-established to account for the changes in network. This consumes a large number of processing resources on the network, and is an inconvenience to all the users of the virtual private network. The entire tunnel must be torn down, and all the communications traveling over it must be halted, all due to the addition of a new network through the virtual private network tunnel. Further, because conventional technologies establish the routing table only once, upon the creation of a virtual private network session, and do not check for changes in the available routes, virtual private network administrators are not able to easily build a redundant solution using conventional technologies.

The present invention overcomes this issue by providing for a dynamic update of a routing table in a concentrator in a virtual private network without needing to tear down and re-establish the Security Associations of the virtual private network tunnel. By way of the present invention, a virtual private network client such as the EzVPN client, be it a hardware client or a software client, may dynamically update the concentrator with information concerning the network to pave the way for a redundant and scalable solution.

To achieve this, a new ISAKMP NOTIFY payload type named "UPDATE_ROUTE" within the informational exchange between peers on the virtual private network is provided. This payload includes a Security Parameter Index (SPI), which is the destination address of the message, as well as Notification Data. A virtual private network client such as the EzVPN client uses this new payload type to update a concentrator about the network information as it changes. When the concentrator receives an UPDATE_ROUTE payload, it takes an appropriate action to update its routing table. This allows the routing table to be changed dynamically, without ending the current session and tearing down the current tunnel and then re-starting the session with a new tunnel to incorporate the updated routing information. In other words, the UPDATE_ROUTE message does not require the Security Associations of the current virtual private network tunnel to be torn down and then re-established in order to update the routing table at the concentrator.

If network information, such as one or more prefixes, is to be deleted from the concentrator's routing table, then the client will encode the appropriate network address(es) in the DELETE attribute of the UPDATE_ROUTE payload and send it to the concentrator. The DELETE attribute is part of the Notification data. The concentrator, upon receiving the UPDATE_ROUTE, will decode the DELETE attribute in the Notification data, and update its routing table accordingly. This will not only help to keep the concentrator's routing table updated, but will also facilitate network reachability for backup routing information (if any) to become effective.

Similarly, if one or more prefixes is to be added to the concentrator's routing table, the client will encode the appropriate network address(es) in the ADD attribute of the UPDATE_ROUTE payload and send it to the concentrator. The ADD attribute is part of the Notification data. The ADD attribute within the UPDATE_ROUTE payload conveys that the network(s) identified by the included address(es) are reachable at the EzVPN client. The concentrator, upon receiving the UPDATE_ROUTE, will decode the ADD attribute in the Notification data, and update its routing table accordingly. Additionally, the ADD attribute would also encode the relevant ADMIN-DISTANCE value of each route. ADMIN-DISTANCE values allow an administrator to set preferences in terms of which routes are preferable if alternative routes are available.

In addition to conveying the specific network information (i.e., prefixes) to the concentrator using the UPDATE_ROUTE message as described above, the client adjusts its own routing table accordingly and is also able to track the prefixes it is interested in. This allows the client to determine those routes that become unavailable over time, for example due to failure of a network component, and then send an UPDATE_ROUTE message to the concentrator so that the concentrator no longer sends traffic to unavailable routes. Similarly, when a previously unavailable route becomes available again, for example when a previously non-functioning network component is repaired, the client may send a new UPDATE_ROUTE message to the concentrator so that it puts the now-available route back into its routing table.

The benefit of the present invention is that the hub/concentrator is updated about client side network changes dynamically and, more importantly, without tearing down and re-establishing the IKE/IPSec Security Associations.

More particularly, in an embodiment there is provided a method for dynamically updating a routing table in a concentrator, where the concentrator is part of a virtual private network that also includes one or more security associations. The method includes identifying a change in the virtual private network, and related network information; creating a notification update message, wherein the notification update message comprises (i) a type of change to be made to the routing table based on the identified change and (ii) the related network information; sending the notification update message to the concentrator, wherein the concentrator updates the routing table according to the notification update message; and maintaining current security associations during the updating of the routing table.

In a related embodiment, identifying may include identifying at least one unavailable network link within the virtual private network and the network address of the at least one unavailable network link; and wherein creating may include creating a notification update message, wherein the type of change comprises a delete attribute and the related network information comprises the network address of the at least one unavailable network link. In a further related embodiment, creating may include encoding the network address of the at least one unavailable network link in the delete attribute of the notification update message.

In another related embodiment, identifying may include identifying at least one newly available network link within the virtual private network and the network address of the at least one newly available network link; and creating may include creating a notification update message, wherein the type of change comprises an add attribute and the related network information comprises the network address of the at least one newly available network link. In a further related embodiment, creating may include creating a notification update message, wherein the type of change comprises an add attribute, wherein the add attribute encodes an admin-distance value to set preferences for alternative routes. In another further related embodiment, creating may include encoding the network address of the at least one newly available network link in the add attribute of the notification update message.

In another embodiment there is provided a method for dynamically updating a routing table in a concentrator, where the concentrator is part of a virtual private network that includes one or more security associations. The method includes receiving a notification update message, wherein the notification update message comprises a type of change to be made to the routing table and related network information; updating the routing table by determining the type of change in the notification update message and making a corresponding change in the routing table according to the related network information; and maintaining current security associations during the updating of the routing table.

In a related embodiment, receiving may include receiving a notification update message, wherein the notification update message comprises an encoded delete attribute and the related network information comprises the network address of at least one unavailable network link, wherein the network address of at least one unavailable network link is encoded as part of the delete attribute; and updating may include updating the routing table by decoding the delete attribute including the network address of at least one unavailable network link, and deleting the network address from the routing table.

In another related embodiment, receiving may include receiving a notification update message, wherein the notification update message comprises an encoded add attribute and the related network information comprises the network address of at least one newly available network link, wherein the network address of at least one newly available network link is encoded as part of the add attribute; and updating may include updating the routing table by decoding the add attribute including the network address of at least one newly available network link, and adding the network address to the routing table. In a further related embodiment, receiving may include receiving a notification update message, wherein the notification update message comprises an encoded add attribute and the related network information comprises the network address of at least one newly available network link, wherein the network address of at least one newly available network link is encoded as part of the add attribute, and wherein the add attribute further encodes an admin-distance value to set preferences for alternative routes.

In another embodiment there is provided a computer program product, stored on a computer readable medium and operable on a virtual private network comprising a comparator and one or more security associations, to dynamically update a routing table in the comparator. The computer program product includes computer program code for identifying a change in the virtual private network, and related network information; computer program code for creating a notification update message, wherein the notification update message comprises (i) a type of change to be made to the routing table based on the identified change and (ii) the related network information; computer program code for sending the notification update message to the concentrator, wherein the concentrator updates the routing table according to the notification update message; and computer program code for maintaining current security associations during the updating of the routing table.

In another embodiment there is provided a computer program product, stored on a computer readable medium and operable on a virtual private network comprising a comparator and one or more security associations, to dynamically update a routing table in the comparator. The computer program product includes computer program code for receiving a notification update message, wherein the notification update message comprises a type of change to be made to the routing table and related network information; computer program code for updating the routing table by determining the type of change in the notification update message and making a corresponding change in the routing table according to the related network information; and computer program code for maintaining current security associations during the updating of the routing table.

In another embodiment there is provided a computer system configured as a client. The computer system includes a memory, a processor, and an interconnection mechanism coupling the memory and the processor, allowing communication there between. The memory is encoded with an update application, that when executed in the processor, provides an update process that dynamically updates a routing table in a concentrator in a virtual private network, the virtual private network including one or more security associations, by causing the computer system to perform the operations of: identifying a change in the virtual private network, and related network information; creating a notification update message, wherein the notification update message comprises (i) a type of change to be made to the routing table based on the identified change and (ii) the related network information; sending the notification update message to the concentrator, wherein the concentrator updates the routing table according to the notification update message; and maintaining current security associations during the updating of the routing table.

In another embodiment there is provided a computer system configured as a comparator. The computer system includes a memory, a processor, and an interconnection mechanism coupling the memory and the processor, allowing communication there between. The memory is encoded with an update application, that when executed in the processor, provides an update process that dynamically updates a routing table in a concentrator in a virtual private network, the virtual private network including one or more security associations, by causing the computer system to perform the operations of: receiving a notification update message, wherein the notification update message comprises a type of change to be made to the routing table and related network information; updating the routing table by determining the type of change in the notification update message and making a corresponding change in the routing table according to the related network information; and maintaining current security associations during the updating of the routing table.

Arrangements of the invention involving a computer program product are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations may be installed onto a computerized device to cause one or more processors in the computerized device to perform the techniques explained herein as embodiments of the invention. Software processes that operate in a collection of computerized devices, such as in a group of data communications devices or other entities may also provide the system of the invention. The system of the invention may be distributed between many software processes on several data communications devices, or all processes could run on a small set of dedicated computers, or on one computer alone.

It is to be understood that the embodiments of the invention may be embodied strictly as a software program, as software and hardware, or as hardware and/or circuitry alone, such as within a data communications device. The features of the invention, as explained herein, may be employed in data communications devices and/or software systems for such devices such as those manufactured by Cisco Systems, Inc. of San Jose, Calif.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Generally, disclosed embodiments include methods and systems for dynamically updating a routing table in a concentrator in a virtual private network without having to tear down and re-established the Security Associations that form a virtual private network tunnel. Typically, when a virtual private network tunnel and its Security Associations are established, a routing table in a concentrator that is part of the virtual private network is set. If the routing table needs to be updated after the tunnel has been established, the virtual private network tunnel and its Security Associations must be torn down and re-established in order to change the routing table. By providing a new notification message type, referred to herein as UPDATE_ROUTE, a routing table in a concentrator may be updated without having to tear down and then re-established a virtual private network tunnel and its Security Associations.

Figure 1A:
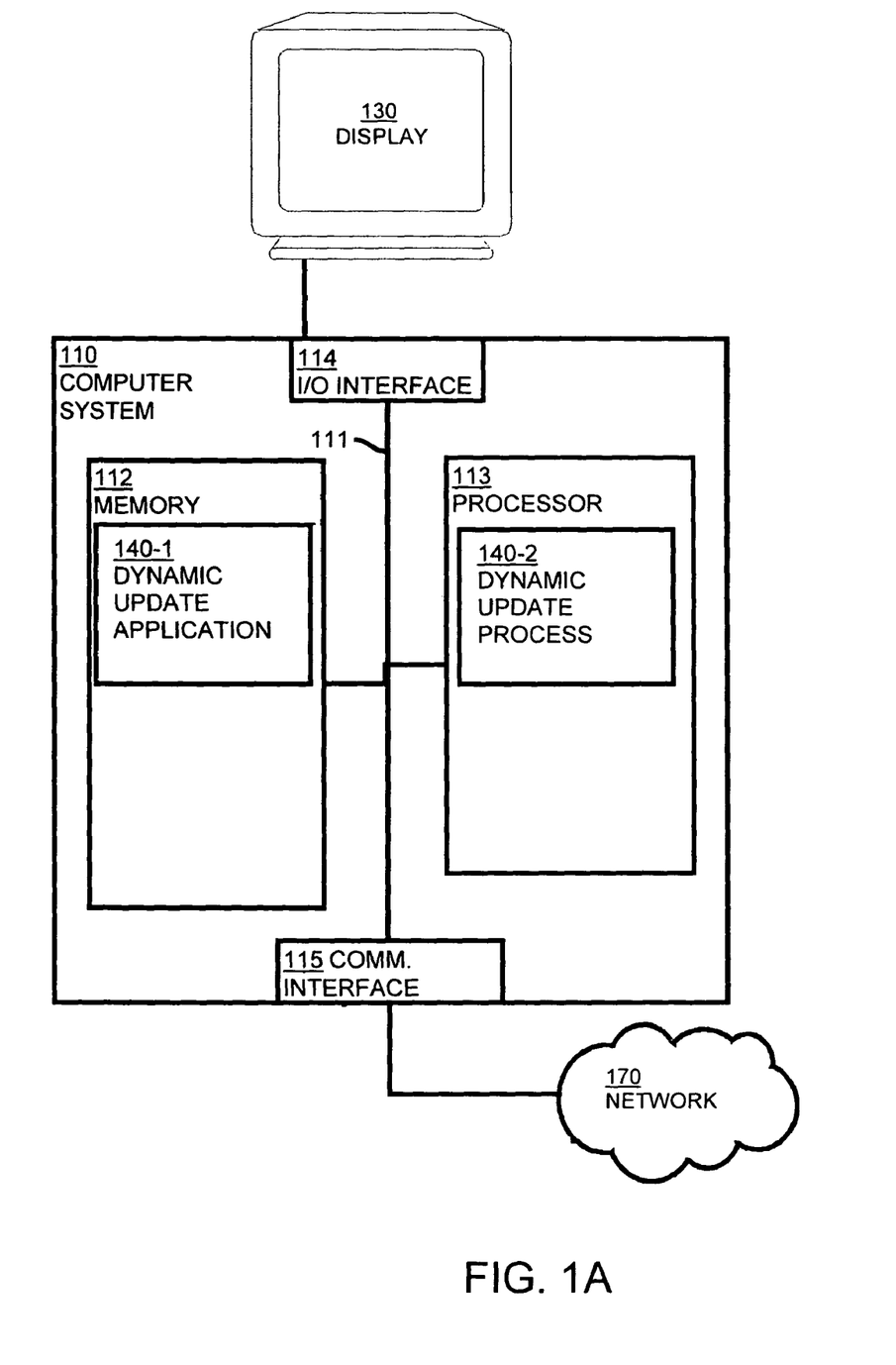
FIG. 1A illustrates an example computer system architecture for a computer system according to one embodiment disclosed herein.

Embodiments disclosed herein provide for dynamically updating a routing table in a concentrator in a virtual private network without tearing down and re-establishing the virtual private network tunnel and its Security Associations, as described below. More particularly, FIG. 1A is a block diagram illustrating an example architecture of a computer system 110 that executes, runs, interprets, operates or otherwise performs a dynamic update application 140-1 and a dynamic update process 140-2 suitable for use in explaining example configurations disclosed herein. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices on a network 170, such as but not limited to a virtual private network as shown in FIG. 1B.

The memory system 112 is any type of computer readable medium and in this example is encoded with a dynamic update application 140-1 that includes dynamic update process 140-2. The dynamic update application 140-1 may be embodied as software code such as data and/or logic instructions (e.g., code stored in the memory system 112 or on another computer readable medium such as a removable disk) that supports processing functionality according to different embodiments described herein. During operation of the computer system 110, the processor 113 accesses the memory system 112 via the interconnection mechanism 111 in order to launch, run, execute, interpret or otherwise perform the logic instructions of the dynamic update application 140-1. Execution of the dynamic update application 140-1 in this manner produces processing functionality in a dynamic update process 140-2. In other words, the dynamic update process 140-2 represents one or more portions or runtime instances of the dynamic update application 140-1 performing or executing within or upon the processor 113 in the computer system 110 at runtime.

It is noted that example configurations disclosed herein include the dynamic update application 140-1 itself including the dynamic update process 140-2 (i.e., in the form of unexecuted or non-performing logic instructions and/or data). The dynamic update application 140-1 may be stored on a computer readable medium (such as a floppy disk), hard disk, electronic, magnetic, optical or other computer readable medium. The dynamic update application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the dynamic update application 140-1 in the processor 113 as the dynamic update process 140-2. Those skilled in the art will understand that the computer system 110 may include other processes and/or software and hardware components, such as an operating system not shown in this example.

Figure 1B:
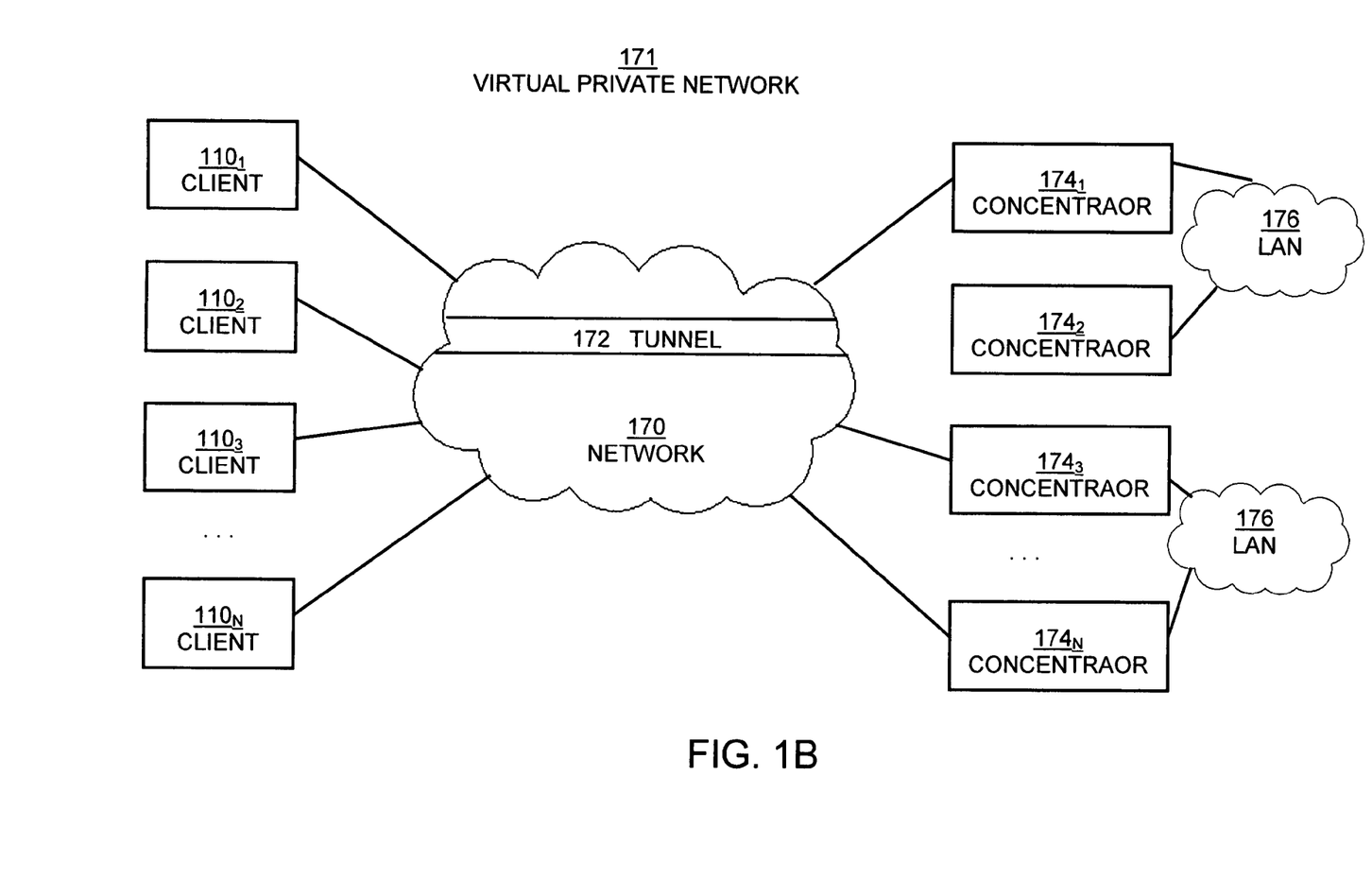
FIGS. 1B and 1C illustrate an example architecture of a virtual private network according to one embodiment disclosed herein.
Figure 1C:
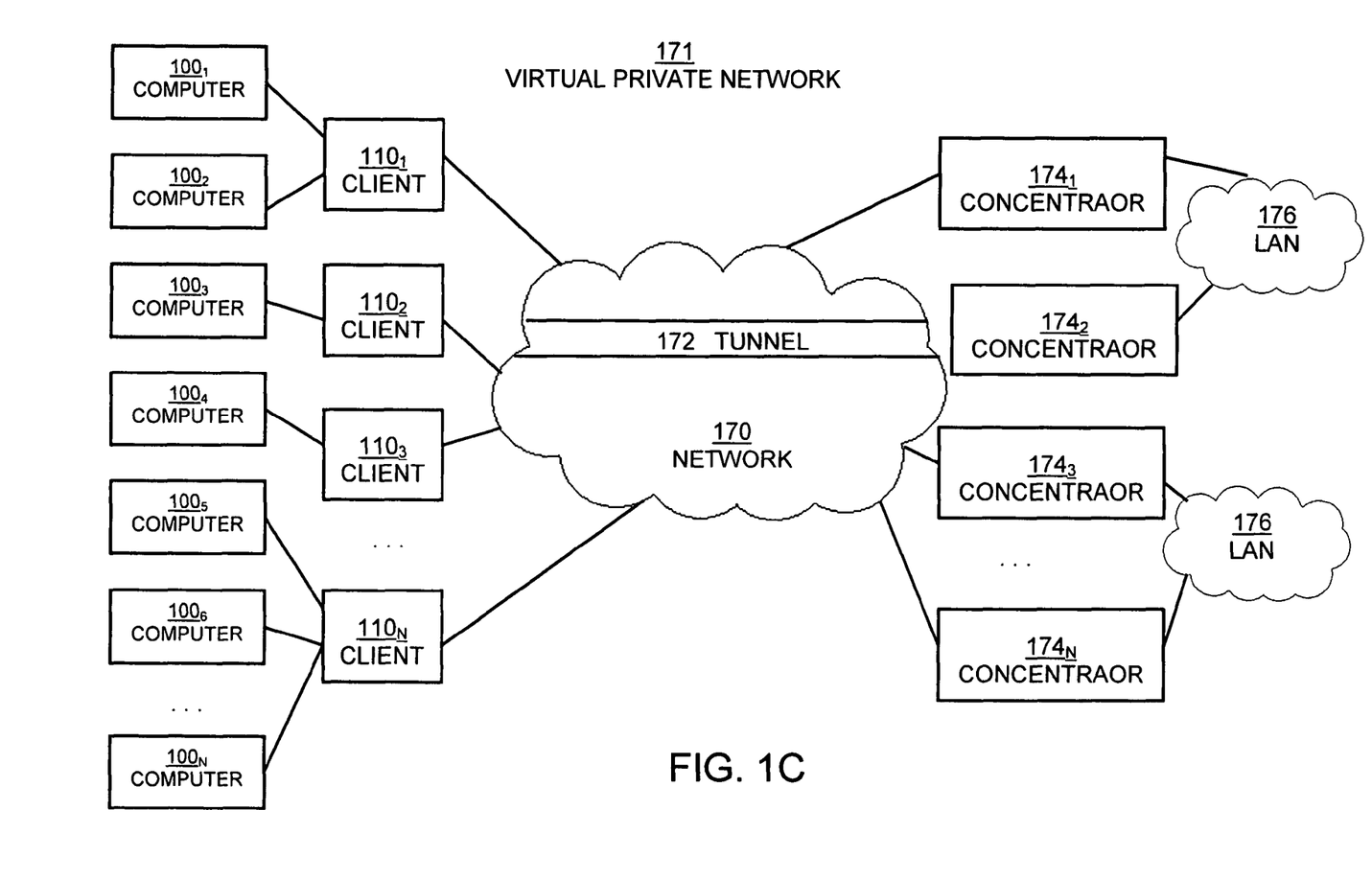

FIGS. 1B and 1C illustrate an example virtual private network with concentrators whose routing tables may be updated by the update application 140-1 of a computer system 110, as shown in FIG. 1A, and also referred to herein as a client or a virtual private network client. A client $110_N$ may be either a hardware client or a software client. In FIG. 1B, the clients $110_1, 110_2, 110_3, \ldots, 110_N$ are software clients. In FIG. 1C, the clients $110_1, 110_2, 110_3, \ldots, 110_N$ are hardware clients, through which one or more computers $100_1, 100_2, 100_3, 100_4, 100_5, 100_6, \ldots, 100_N$ may connect to a virtual private network 171. Any number of clients $110_1, 110_2, 110_3 \ldots 110_N$ may connect to the virtual private network 171 through, for example but not limited to, a network 170 such as the Internet. The virtual private network 171 may include, for example but not limited to, one or more local area networks (LANs) 176 as well as other network components (not shown). More specifically, a client $110_N$ communicates with a concentrator $174_N$ to establish a virtual private network tunnel 172 over the network 170. The virtual private network tunnel 172 is a secure connection between the client $110_N$ and the virtual private network 171 that uses publicly-accessible network components on the Internet 170 to send network traffic between the client $110_N$ and the virtual private network 171. All network traffic traveling over the tunnel 172 is encrypted, as is the particular route over the tunnel 172 that the network traffic travels on. To establish the tunnel 172, the client $110_N$ and the concentrator $174_N$ use a series of secure protocols, such as but not limited to IKE and IPSec. First, the client $110_N$ and the concentrator $174_N$ use a secure protocol such as IKE to establish a secure method of communicating encryption information. Once the client $110_N$ and the concentrator $174_N$ are able to send encrypted information to and from each other, the client $110_N$ and the concentrator $174_N$ use a secure protocol such as IKE to establish the IPSec Security Associations that form the virtual private network tunnel. One or more routing tables will then be initialized in the concentrator $174_N$ with available routes for network traffic traveling between the client $110_N$ and the virtual private network 171, or in FIG. 1C, between the computer $100_N$ and the virtual private network 171. The client $110_N$, or in FIG. 1C, the computer $100_N$, and the LAN 176 on the virtual private network 171 may exchange network traffic through one or more of the routes in the routing table of the concentrator $174_N$.

A number of flowcharts of the presently disclosed method are illustrated in FIGS. 2, 3A and 3B, 4, and 5A and 5B. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flowcharts do not depict the syntax of any particular programming language. Rather, the flowcharts illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Figure 2:
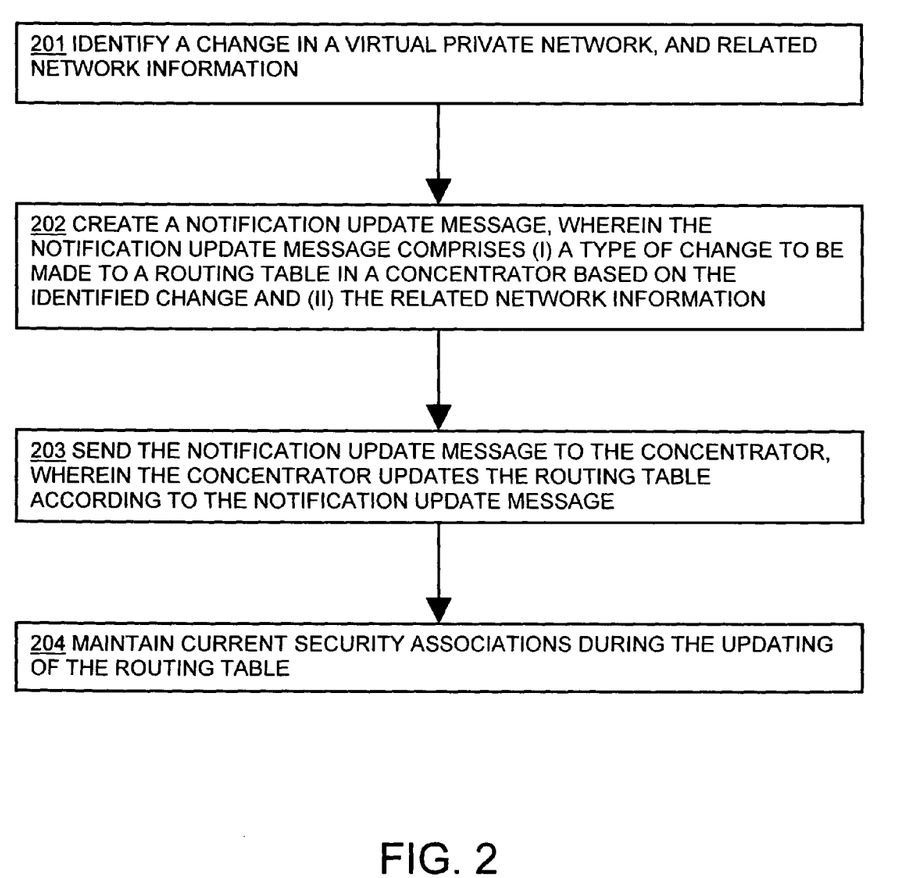
FIG. 2 illustrates a flowchart of a procedure performed by the computer system depicted in FIG. 1A when dynamically updating a routing table in a concentrator in a virtual private network depicted in FIGS. 1B and 1C from the perspective of a client on the virtual private network.
Figure 3A:
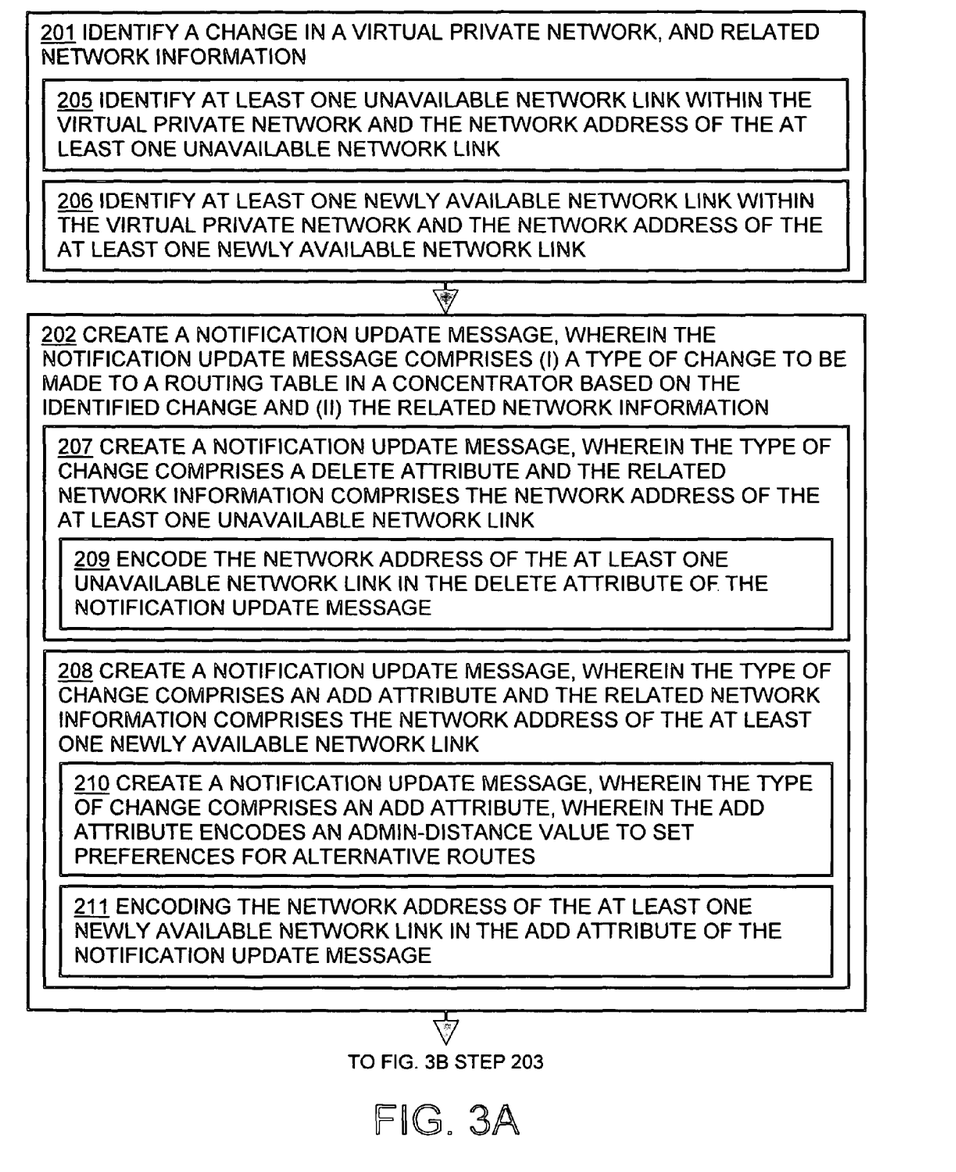
FIGS. 3A and 3B illustrate a flowchart of a procedure preformed by the computer system depicted in FIG. 1A when dynamically updating a routing table in a concentrator in a virtual private network depicted in FIGS. 1B and 1C with one or more network addresses to be removed from the routing table and/or one or more network addresses to be added to the routing table, from the perspective of a client on the virtual private network.
Figure 3B:
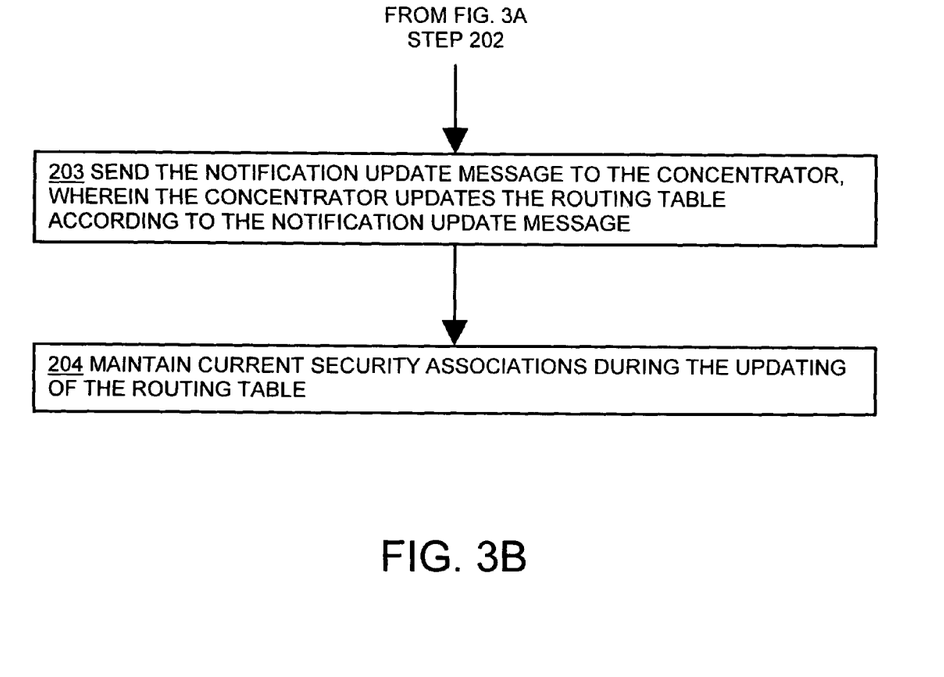

More specifically, FIGS. 2 and 3A and 3B illustrate flowcharts of a method to dynamically update a routing table in a concentrator in a virtual private network from the perspective of a client, as shown in FIG. 1A, on the virtual private network as shown in FIGS. 1B and 1C.

The client $110_N$, having established a virtual private network tunnel 172 with the virtual private network 171 as described above, identifies a change in the virtual private network 171, step 201. For example, the client $110_N$ may identify that a network link (not shown) in the LAN 176 is unavailable, step 205. A change in the virtual private network may also include changes made to the IPSec proxy list. The IPSec proxy list identifies what traffic is to be encrypted and decrypted as the traffic enters and exists the virtual private network tunnel. The network link may be located at any point in the virtual private network 171, or, if access to the virtual private network 171 is through a hardware client $110_N$, the network link may be at any point in the connection between a computer $100_N$ and a hardware client $110_N$. The network link may be unavailable, for example, due to a failure of the network link, or due to the failure of a router to which the network link is connected. Alternatively, the client $110_N$ may identify that a network link is newly available, step 206, for example, due to the repair of a router that had previously failed and made the network link unavailable. The client $110_N$ also identifies network information that is related to the identified change in the virtual private network 171, step 201. For example, if the client $110_N$ has identified an unavailable network link, the client $110_N$ will identify the network address, or prefix, of the unavailable network link and/or the network address of the router that has failed, step 205. Similarly, if the client $110_N$ has identified a newly available network link, the client $110_N$ will identify the network address, or prefix, of the newly available network link and/or the network address of the router that has been, for example, repaired, step 206.

Figure 6:
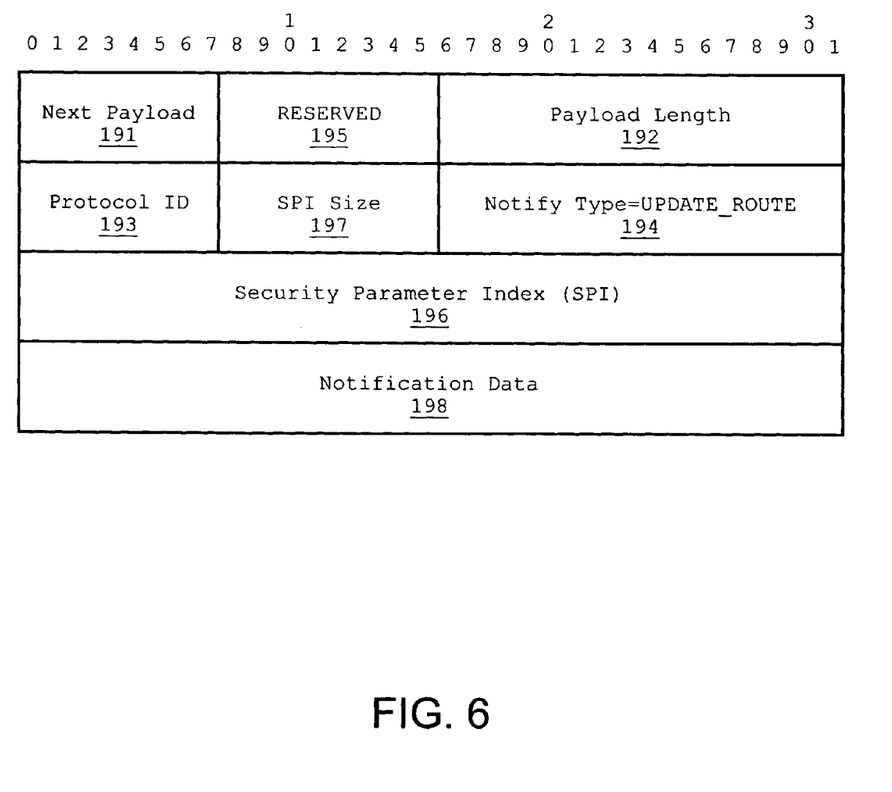
FIG. 6 is an example of an UPDATE_ROUTE NOTIFY payload type sent to dynamically update a routing table in a concentrator in a virtual private network depicted in FIGS. 1B and 1C.

Having identified a change in the virtual private network 171, the client $110_N$ will execute the dynamic update application 140-1 as the dynamic update process 140-2. The dynamic update process 140-2 will take the identified change in the virtual private network 171 and the related network information and create a notification update message, step 202. An example notification update message, known as a "NOTIFY_ROUTE" message, is shown in FIG. 6, and is one of many NOTIFY messages available to be sent from the client $110_N$ to the virtual private network 171 through the INFORMATIONAL exchange between the client $110_N$ and the concentrator $174_N$. In addition to including fields for an identifier of the next NOTIFY message 191, the length of the current NOTIFY message 192, the ID of the protocol being used 193, the type of NOTIFY message 194 (here, "NOTIFY_ROUTE"), a reserved field 195, and a Security Parameter Index (SPI) field 196 and an SPI size field 197, the notification update message includes a type of change to be made to a routing table in the concentrator 174$_N$, based on the identified change in the virtual private network 171. The type of change to be made is part of a Notification Data field 198. The Notification Data field 198 also includes the related network information. The Notification Data field 198 will thus vary depending on the change the client 110$_N$ identifies in the virtual private network 171.

For example, if the client 110$_N$ has identified an unavailable network link, the type of change to be made to the routing table in the concentrator 174$_N$ will be the deletion of the network address of that unavailable network link. In this situation, the Notification Data field 198 will include a delete attribute and the network address of the unavailable network link, step 207. The network address of the unavailable network link may be encoded within the delete attribute, step 209.

Alternatively, if the client 110$_N$ has identified a newly available network link, the type of change to be made to the routing table in the concentrator 174$_N$ will be the addition of the network address of that newly available network link. In this situation, the Notification Data field 198 will include an add attribute and the network address of the newly available network link, step 208. The network address of the newly available network link may be encoded within the add attribute, step 211. The add attribute may also encode an ADMIN-DISTANCE value, step 210. An ADMIN-DISTANCE value allows for the setting of preferences for alternative routes within the routing table. For example, if the newly available network link is a high-speed network link, such as a fiber optic cable capable of carrying large amounts of network traffic, the ADMIN-DISTANCE value encoded as part of the add attribute in the Notification Date field 198 may be such that the concentrator 174$_N$ will attempt to use this newly available network link as an alternate route for network traffic over the virtual private network 171 over other potentially available alternate routes over the virtual private network 171.

Once the dynamic update process 140-2 has created the notification update message, the notification update message is sent from the client 110$_N$ to the concentrator 174$_N$, step 203. Upon receipt of the notification update message, the concentrator 174$_N$ updates the appropriate routing table according to the notification update message, as described in greater detail below with regards to FIGS. 4, 5A, and 5B. During the updating of the appropriate routing table by the concentrator 174$_N$, the current Security Associations of the virtual private network 171 are maintained.

Figure 4:
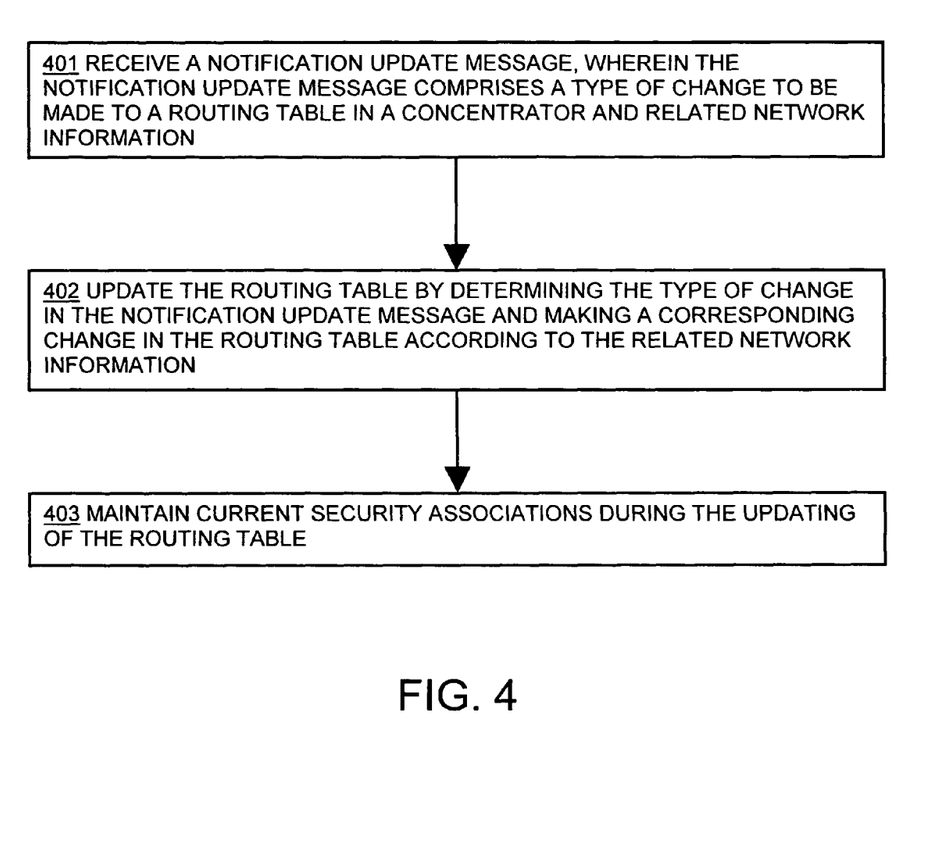
FIG. 4 illustrates a flowchart of a procedure performed by the computer system depicted in FIG. 1A when dynamically updating a routing table in a concentrator in a virtual private network depicted in FIGS. 1B and 1C from the perspective of a concentrator on the virtual private network.
Figure 5A:
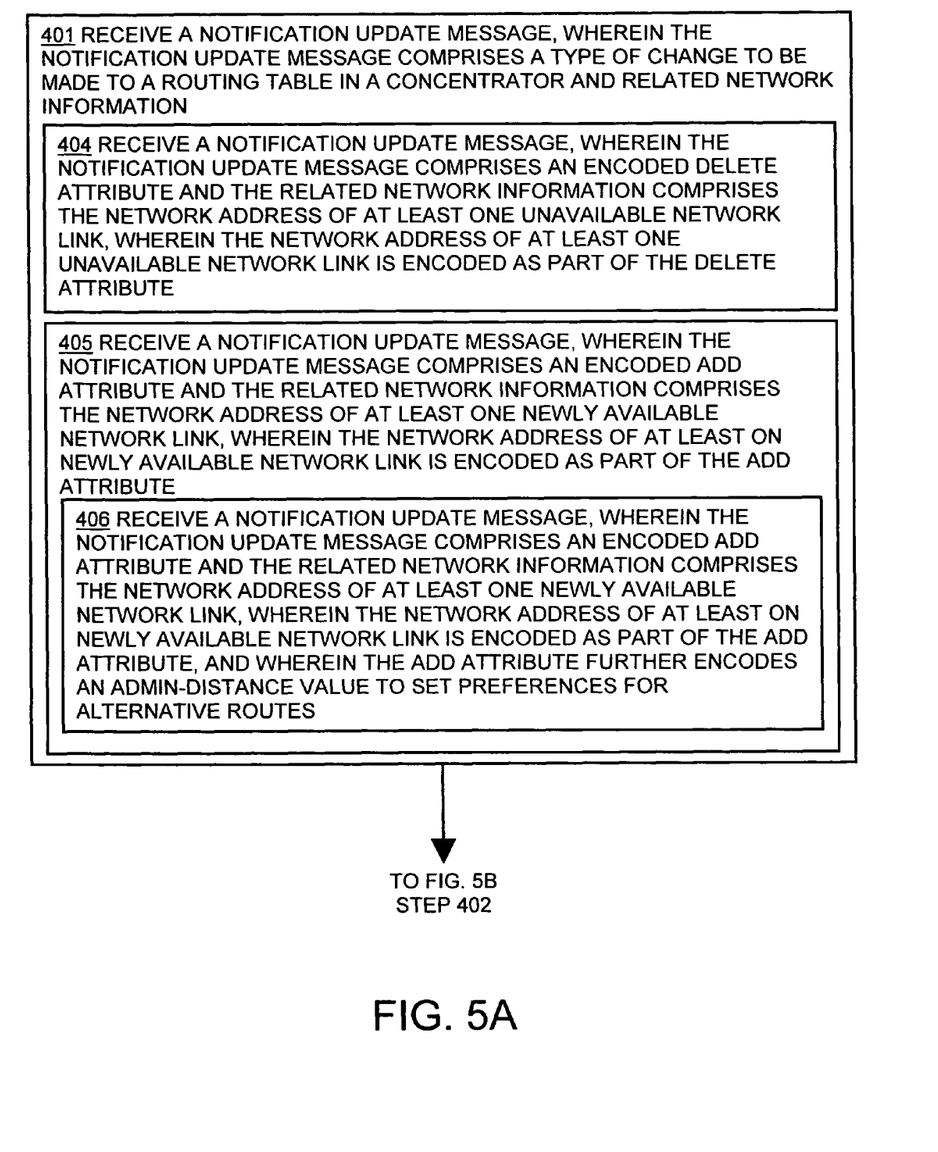
FIGS. 5A and 5B illustrate a flowchart of a procedure preformed by the computer system depicted in FIG. 1A when dynamically updating a routing table in a concentrator in a virtual private network depicted in FIGS. 1B and 1C with one or more network addresses to be removed from the routing table and/or one or more network addresses to be added to the routing table, from the perspective of a concentrator on the virtual private network.
Figure 5B:
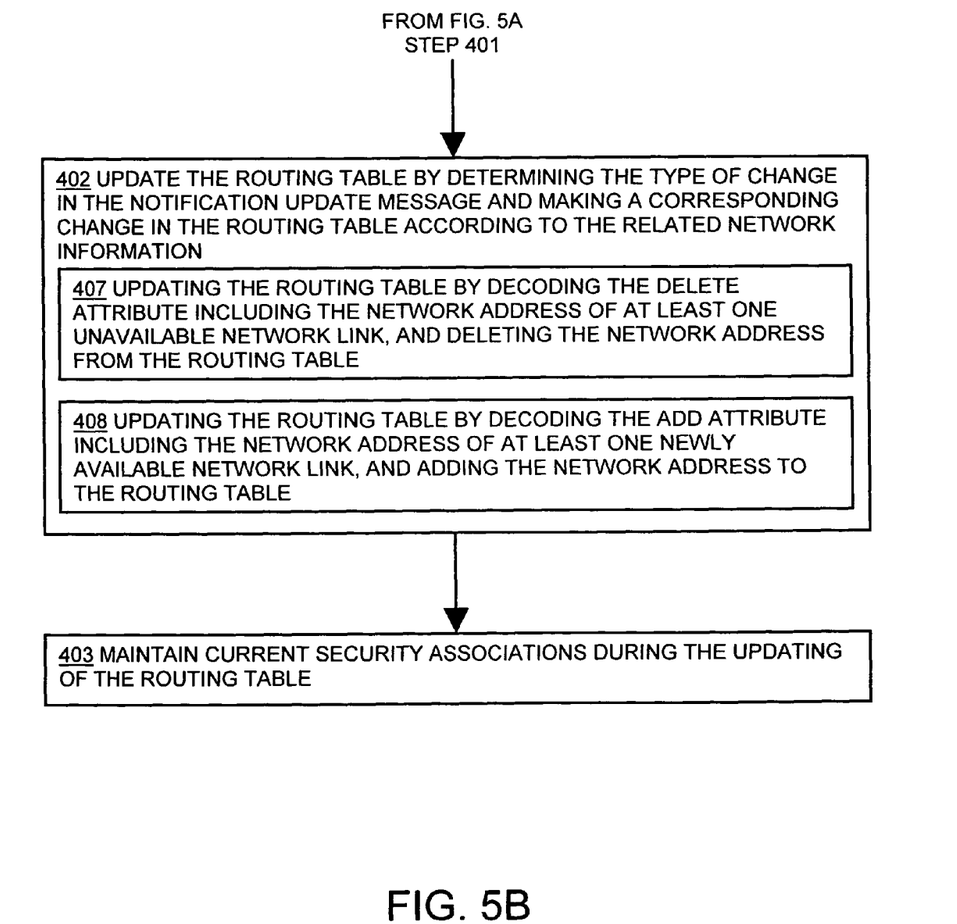

FIGS. 4 and 5A and 5B illustrate flowcharts of a method to dynamically update a routing table in a concentrator 174$_N$ in a virtual private network 171 from the perspective of the concentrator 174N, as shown in FIGS. 1A, 1B, and 1C.

After the client 110$_N$ has created and sent a notification update message to the concentrator 174$_N$, as described above, the concentrator 174$_N$ receives the notification update message, step 401. The notification update message includes a type of change to be made to the routing table of the concentrator 174$_N$ and related network information. For example, if a network address is to be deleted from the routing table of the concentrator 174$_N$, the notification update message will include a delete attribute and the network address of an unavailable network link, step 404. The network address of the unavailable network link may be encoded as part of the delete attribute, which is found in the Notification Field 198 of the notification update message. Alternatively, if a network address is to be added to the routing table of the concentrator 174$_N$, the notification update message will include an add attribute and the network address of a newly available network link, step 405. The network address of the newly available network link may be encoded as part of the add attribute, which is found in the Notification Field 198 of the notification update message. Additionally, if the notification update message includes an add attribute, the Notification Field 198 of the notification update message may also include an ADMIN-DISTANCE value, step 406, which may be encoded as part of the add attribute.

The concentrator 174$_N$ then updates the appropriate routing table by determining the type of change in the notification update message and making a corresponding change in the routing table according to the related network information, step 402. For example, if the notification update message included a delete attribute and the network address of an unavailable network link, then the concentrator 174$_N$ will update the routing table by decoding the delete attribute including the network address of the unavailable network link, and deleting that network address from the routing table, step 407. Alternatively, if the notification update message included an add attribute and the network address of a newly available network link, then the concentrator 174$_N$ will update the routing table by decoding the add attribute including the network address of the unavailable network link, and adding that network address to the routing table, step 408. If the add attribute also included an ADMIN-DISTANCE value, the concentrator 174$_N$ will decode the ADMIN-DISTANCE value and update the routing table such that the added network address has a preference value equal to the ADMIN-DISTANCE value. During the updating of the routing table of the concentrator 174$_N$, current Security Associations of the virtual private network 171 are maintained.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method comprising:
   establishing a tunnel between a plurality of peers that are configured to couple to a virtual private network, the tunnel having one or more security associations to enable secure communications between the plurality of peers through the tunnel;
   while the tunnel is established, identifying a change in the virtual private network, and related network information;
   creating a notification update message, wherein the notification update message comprises (i) based on the identified change, a type of change to be made to a routing table of a concentrator configured to couple to the virtual private network and (ii) the related network information;
   sending the notification update message to the concentrator without creating a new tunnel at the time of sending, wherein the concentrator updates the routing table according to the notification update message; and
   maintaining the one or more security associations and the tunnel during the updating of the routing table;
   wherein the update message is sent through the tunnel between the plurality of peers.

2. The method of claim 1 wherein identifying comprises:
   identifying at least one unavailable network link within the virtual private network and the network address of the at least one unavailable network link; and wherein creating comprises:
   creating a notification update message, wherein the type of change comprises a delete attribute and the related network information comprises the network address of the at least one unavailable network link.

3. The method of claim 2 wherein creating comprises:
   encoding the network address of the at least one unavailable network link in the delete attribute of the notification update message.

4. The method of claim 1 wherein identifying comprises:
   identifying at least one newly available network link within the virtual private network and the network address of the at least one newly available network link;
   and wherein creating comprises:
   creating a notification update message, wherein the type of change comprises an add attribute and the related network information comprises the network address of the at least one newly available network link.

5. The method of claim 4 wherein creating comprises:
   creating a notification update message, wherein the type of change comprises an add attribute, wherein the add attribute encodes an admin-distance value to set preferences for alternative routes.

6. The method of claim 4 wherein creating comprises:
   encoding the network address of the at least one newly available network link in the add attribute of the notification update message.

7. A non-transitory computer-readable medium storing instructions, which, when executed by one or more processors, cause one or more computing devices to perform operations comprising:
- establishing a tunnel between a plurality of peers that are configured to couple to a virtual private network, the tunnel having one or more security associations to enable secure communications between the plurality of peers through the tunnel;
- identifying a change in the virtual private network, and related network information while the tunnel is established;
- creating a notification update message, wherein the notification update message comprises (i) based on the identified change, a type of change to be made to a routing table of a concentrator configured to couple to the virtual private network and (ii) the related network information;
- sending the notification update message to the concentrator without creating a new tunnel at the time of sending, wherein the concentrator updates the routing table according to the notification update message;
- wherein the update message is sent through the tunnel between the plurality of peers; and
- maintaining the one or more security associations and the tunnel during the updating of the routing table.

8. The non-transitory computer-readable medium of claim 7 wherein the instructions for identifying cause the one or more computing devices to perform operations comprising:
- identifying at least one unavailable network link within the virtual private network and the network address of the at least one unavailable network link;
- and wherein the instructions for creating cause the one or more computing devices to perform operations comprising:
- creating a notification update message, wherein the type of change comprises a delete attribute and the related network information comprises the network address of the at least one unavailable network link.

9. The non-transitory computer-readable medium of claim 7 wherein the instructions for identifying comprises:
- identifying at least one newly available network link within the virtual private network and the network address of the at least one newly available network link;
- and wherein the instructions for creating cause the one or more computing devices to perform operations comprising:
- creating a notification update message, wherein the type of change comprises an add attribute and the related network information comprises the network address of the at least one newly available network link.

10. The non-transitory computer-readable medium of claim 9 wherein the instructions for creating cause the one or more computing devices to perform operations comprising:
- creating a notification update message, wherein the type of change comprises an add attribute, wherein the add attribute encodes an admin-distance value to set preferences for alternative routes.

11. A computer system configured as a client comprising:
a memory;
a processor;
an interconnection mechanism coupling the memory and the processor allowing communication there between;
wherein the memory is encoded with an update application, that when executed in the processor, provides an update process that dynamically updates a routing table in a concentrator configured to couple to a virtual private network, by causing the computer system to perform the operations of:
- establishing a tunnel between a plurality of peers that are configured to couple to a virtual private network, the tunnel having one or more security associations to enable secure communications between the plurality of peers through the tunnel;
- while the tunnel is established, identifying a change in the virtual private network, and related network information;
- creating a notification update message, wherein the notification update message comprises (i) a type of change to be made to the routing table based on the identified change and (ii) the related network information;
- sending the notification update message to the concentrator without creating a new tunnel at the time of sending, wherein the concentrator updates the routing table according to the notification update message; and maintaining the one or more security associations and the tunnel during the updating of the routing table;
- wherein the update message is sent through the tunnel between the plurality of peers.

12. The computer system of claim 11 wherein identifying comprises:
- identifying at least one unavailable network link within the virtual private network and the network address of the at least one unavailable network link; and wherein creating comprises:
- creating a notification update message, wherein the type of change comprises a delete attribute and the related network information comprises the network address of the at least one unavailable network link.

13. The computer system of claim 11 wherein identifying comprises:
- identifying at least one newly available network link within the virtual private network and the network address of the at least one newly available network link; and wherein creating comprises:
- creating a notification update message, wherein the type of change comprises an add attribute and the related network information comprises the network address of the at least one newly available network link.

14. The computer system of claim 13 wherein creating comprises:
- creating a notification update message, wherein the type of change comprises an add attribute, wherein the add attribute encodes an admin-distance value to set preferences for alternative routes.

\* \* \* \* \*